(No Model.)
C. L. COFFIN.
METHOD OF SOLDERING OR BRAZING BY ELECTRICITY.
No. 460,428. Patented Sept. 29, 1891.
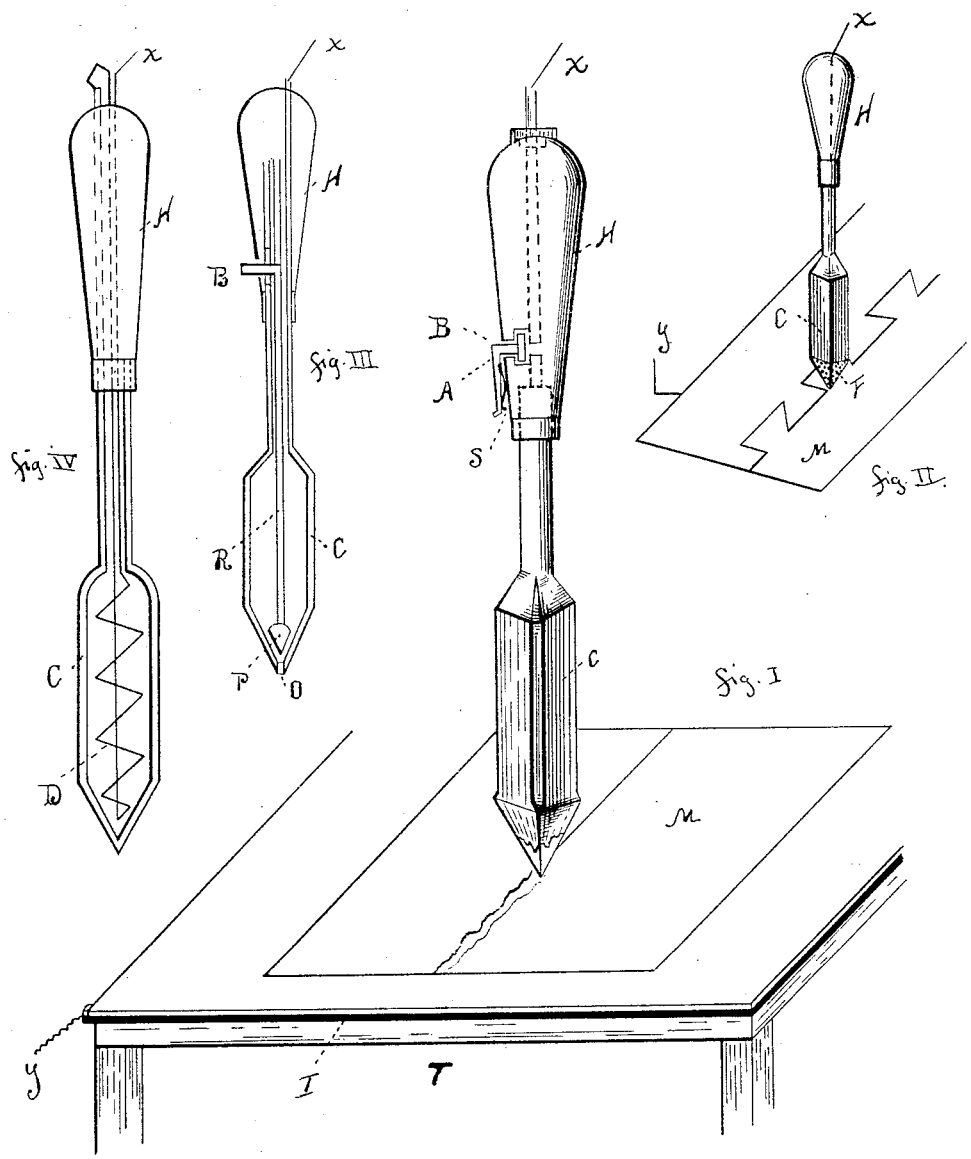

UNITED STATES PATENT OFFICE.

CHARLES L. COFFIN, OF DETROIT, MICHIGAN.

METHOD OF SOLDERING OR BRAZING BY ELECTRICITY.

SPECIFICATION forming part of Letters Patent No. 460,428, dated September 29, 1891.

Application filed April 17, 1890. Serial No. 348,428. (No model.)

*To all whom it may concern:*

Be it known that I, CHARLES L. COFFIN, of Detroit, in the county of Wayne and State of Michigan, have invented a new and useful Improvement in the Mode of Soldering or Brazing Metal, of which the following is a specification.

My invention consists in an improved mode of soldering or brazing metal, hereinafter fully described and claimed.

The drawings indicate apparatus which may be used to practice my invention, Figures I and II being perspectives, and Figs. III and IV the solder or brazing tool, partly in section.

T represents a table, the top of which may be made of a conductor insulated by the insulating material I, and connected by a conductor Y with one pole of a generator; or the table-top may be made of wood or other non-conducting material, and one or both of the articles to be brazed or soldered (represented by M) may be connected by the conductor Y with one pole of a generator, as indicated in Fig. II.

C represents the head of a soldering-iron, which may be solid, as indicated in Fig. I, or provided with a point F of high resistance, as indicated in Fig. II, or may be made hollow to act as a reservoir for metal or solder, as shown in Fig. III, in which case it would be provided with an opening O at its point, and a valve P, actuated by a valve-stem R, and a pin B, passing through a slot in the handle H; or, as shown in Fig. IV, the head C of the soldering-iron may be made hollow, and may have within it a resistance-coil D, to increase the heating effect. Whichever of these forms be used, the tool is connected in any convenient way by the conductor X to the other pole of said generator, and a circuit-closer A, normally held out of contact with the circuit by the spring S, as shown in Fig. I, may be provided to enable the operator to turn the current on or off at will. The current being completed through one or both of the articles M and the soldering-tool, heat is developed at the point of contact between the tool and the seam to be soldered or brazed, this being an imperfect contact, and the tool is used for either brazing or soldering in the well-known manner.

What I claim as my invention, and desire to secure by Letters Patent, is—

The herein-described process of soldering or brazing, consisting in connecting one or both of the articles to be soldered or brazed with one pole of a generator, connecting the tool to the other pole of the generator, bringing the tool in contact with the solder and seam to be soldered or brazed, and passing an electric current through the tool and material while the tool is maintained in contact with the solder and seam, substantially as set forth.

CHARLES L. COFFIN.

Witnesses:
HENRY B. LOTHROP,
CYRUS E. LOTHROP.